US007647073B2

(12) United States Patent
Sung et al.

(10) Patent No.: US 7,647,073 B2
(45) Date of Patent: Jan. 12, 2010

(54) APPARATUS AND METHOD FOR CHANNEL ESTIMATION IN AN SDMA-OFDM SYSTEM

(75) Inventors: Sang-Hoon Sung, Suwon-Si (KR); Jee-Hyun Kim, Seongnam-si (KR); Eun-Sun Choi, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 707 days.

(21) Appl. No.: 11/368,532

(22) Filed: Mar. 7, 2006

(65) Prior Publication Data

US 2006/0205437 A1 Sep. 14, 2006

(30) Foreign Application Priority Data

Mar. 8, 2005 (KR) ...................... 10-2005-0018976

(51) Int. Cl.
*H04M 1/00* (2006.01)
(52) U.S. Cl. .................... 455/562.1; 455/525; 455/436; 455/437; 455/450; 375/259; 375/295; 375/316; 375/346; 370/329; 370/337; 370/347; 370/350
(58) Field of Classification Search ............. 455/562.1, 455/525, 436, 437, 450, 524, 442, 453; 375/259, 375/295, 316, 346, 347, 349, 299; 370/329, 370/337, 347, 350, 442
See application file for complete search history.

(56) References Cited

U.S. PATENT DOCUMENTS

| 7,352,718 | B1 * | 4/2008 | Perahia et al. | 370/329 |
| 2006/0035643 | A1 * | 2/2006 | Vook et al. | 455/450 |
| 2006/0109814 | A1 * | 5/2006 | Kuzminskiy et al. | 370/329 |

FOREIGN PATENT DOCUMENTS

KR      2003-0083473      10/2003

* cited by examiner

*Primary Examiner*—Tuan A Pham
(74) *Attorney, Agent, or Firm*—Roylance, Abrams, Berdo & Goodman, L.L.P.

(57) ABSTRACT

Provided is a channel estimation apparatus and method in a broadband wireless communications system using a smart antenna are provided. In the channel estimation apparatus, an FFT processor converts a received time-domain signal into a frequency-domain signal by FFT-processing the received time-domain signal. A channel acquirer estimates a first channel information for an SDMA user using a preamble signal allocated to the SDMA user in the frequency-domain signal. A channel tracker estimates a second channel information for the SDMA user using pilots in a data area allocated to the SDMA user in the frequency-domain signal. A channel estimator estimates a final channel information by weighting the first channel information and the second channel information according to a channel change rate.

19 Claims, 9 Drawing Sheets

APPARATUS AND METHOD FOR CHANNEL ESTIMATION IN AN SDMA-OFDM SYSTEM

CROSS-REFERENCE TO RELATED PATENT APPLICATION

This application claims the benefit under 35 U.S.C. §119 (a) of Korean Patent Application No. 2005-18976, filed Mar. 8, 2005, in the Korean Intellectual Property Office, the entire disclosure of which is hereby incorporated by reference.

BACKGROUND OF THE INVENTION

1. Field of the Invention

The present invention relates to a broadband wireless communications system. More particularly, the present invention relates to an apparatus and method for performing channel estimation using pilots and a preamble in a broadband wireless communications system supporting Space Division Multiple Access (SDMA).

2. Description of the Related Art

With the dawn of the wireless multimedia era, demand for high-speed wireless transmission of large amounts of data has rapidly increased. This increasing demand has become a driving force behind worldwide active research concerning high-speed wireless data transmission systems to provide Internet service using radio channels.

While $3^{rd}$ Generation (3G) communications systems support up to 2 Mbps for stationary users, $4^{th}$ Generation (4G) communication systems aim to provide 1 Gbps for stationary users or pedestrians within a Wireless Local Area Network (WLAN) environment and 100 Mbps for vehicles within a Wireless Metropolitan Area Network (WMAN) environment. However, since wireless high-speed data transmission using radio channels surfers from a high error rate due to multipath interference, a radio access technique suitable for radio channels is needed.

In order to reduce errors caused by the multipath interference of radio channels, Institute of Electrical and Electronics Engineers (IEEE) 802.16d systems have been developed in which the physical channels of the WMAN system operate in Orthogonal Frequency Division Multiplexing (OFDM) and Orthogonal Frequency Division Multiple Access (OFDMA). IEEE 802.16d systems are defined in the IEEE 802.16d wireless communications standard, the entire disclosure of which is hereby incorporated by reference. These IEEE 802.16d systems realize high-speed data transmission by sending physical channel signals on a plurality of subcarriers. However, IEEE 802.16d systems are only for fixed wireless connections.

The IEEE 802.16e wireless communications standard, the entire disclosure of which is hereby incorporated by reference, is an amended variant of IEEE 802.16d and is expected to enable connections for mobile devices. IEEE 802.16e offers a standard mechanism to support an Adaptive Antenna System (AAS) mode and a non-AAS mode in one frame. The benefit of applying the AAA mode to systems is an increase in both cell capacity and cell coverage.

The AAS adaptively forms a beam pattern in accordance with a varying radio channel environment by continuously monitoring a cell area. Given one Mobile Station (MS) and no interference, the AAS creates an effective antenna pattern that tracks the movement of the MS, thereby adapting to the movement of the MS. The antenna pattern has the highest gain in the direction of the MS. With this AAS, SDMA can be implemented. As such, given N MSs, N beams of the same frequency band are steered in the directions of the individual MSs. Thereby, the MSs share the same time and frequency resources.

FIG. 1 illustrates a conventional SDMA cellular system. Referring to FIG. 1, a Base Station (BS) 101 in a smart antenna system forms different beams 102 and 103 for MSs at different locations. The beams 102 and 103 are formed in accordance with corresponding beam patterns in order to spatially divide the same frequency and time resources. To form the spatially divided downlink beams, the BS 101 needs uplink channel information. Thus, AAS preamble symbols are added on the downlink and the uplink to support the AAS mode in the IEEE 802.16e OFDMA system, as illustrated in FIG. 2.

FIG. 2 illustrates the structures of a downlink frame 201 and an uplink frame 202 in the conventional IEEE 802.16e OFDMA system.

Referring to FIG. 2, an AAS preamble is delivered at the start of downlink and uplink bursts. For downlink beamforming, the BS 101 performs channel estimation using the uplink AAS preamble and estimates a beam coefficient based on the estimated channel information. The BS 101 then forms a beam using the beam coefficient. Since spatial channels 102 and 103 resulting from the beamforming are divided in space, as shown in FIG. 1, they do not interfere with one another despite sharing the same frequency and time resources. Consequently, each spatial channel fully utilizes the frequency and time resources assigned by the system.

The uplink preamble is used in compliance with the physical layer standard of the IEEE 802.16e OFDMA system as follows.

According to the physical layer standard of the OFDMA system, AAS preambles assigned to SDMA users utilize the same Pseudo Noise (PN) code. In OFDM modulation of the PN code sequence, therefore, each SDMA user multiplies a specific user signature by the PN code sequence, for user identification. The user signature is given as $$a = \frac{1}{N_{tile(bin)\_size}} \times \begin{bmatrix} e^{j\frac{2\pi f(k)m}{N_{tile(bin)\_size}}} \\ e^{j\frac{2\pi[f(k)+1]m}{N_{tile(bin)\_size}}} \\ \vdots \\ e^{j\frac{2\pi[f(k)+N_{tile(bin)\_size}-1]m}{N_{tile(bin)\_size}}} \end{bmatrix} \quad (1)$$

where $N_{tile(bin)\_size}$ denotes the number of tones per tile (or bin) (9 tones for an Adaptive Modulation and Coding (AMC) bin and 4 tones for a Partial Usage SubCarrier (PUSC) tile) and f(k) denotes the first tone index of a $k^{th}$ tile (or bin) in the AAS preamble. m is a user index, representing cyclical time shifts for the SDMA user (e.g. 0, 1, 2, 3, ..., $N_{tile(bin)\_size}-1$). That is, $$e^{j\frac{2\pi f(k)m}{N_{tile(bin)\_size}}}$$

denotes the phase rotation of a tone with the tone index f(k), determined by m.

The user signature expressed in Eq. (1) leads to a linear phase rotation of the PN code sequence for the user in the frequency domain. This is equivalent to cyclical time shifting at a predetermined interval in the time domain. For a PUSC or AMC channel with clustered tones, the user signature functions to assign an orthonormal kernel between SDMA users.

FIG. 3 is a block diagram of an uplink channel estimation apparatus in a BS in a conventional SDMA-OFDMA system. Because the channel estimation is performed in the same manner with respect to each antenna, the channel estimation for one antenna is shown and described by way of example.

Referring to FIG. 3, the BS downconverts a Radio Frequency (RF) signal received through an antenna 301 to a baseband signal and converts the baseband analog signal to a baseband digital signal.

A Cyclic Prefix (CP) remover 303 removes a CP from the baseband digital signal. A Fast Fourier Transform (FFT) processor 305 converts the time-domain signal received from the CP remover 303 into a frequency-domain signal by using a N-point FFT.

An AAS preamble tone extractor 307 extracts an AAS preamble signal from the frequency-domain signal that corresponds to an area assigned to the SDMA user. A preamble code multiplier 309 removes a PN code multiplied by the tones of the preamble signal by $$\bar{y} = \begin{bmatrix} \bar{y}_1 \\ \bar{y}_2 \\ \vdots \\ \bar{y}_n \end{bmatrix} = c \cdot y \quad (2)$$

where y denotes the FFT signal from the FFT processor 305, c denotes a PN code vector for the AAS preamble, and $\bar{y}_n$ denotes an $n^{th}$ AMC bin (or PUSC tile) multiplied by the PN code vector. Here, $$\bar{y}_n = [\bar{y}(f_k), \bar{y}(f_{k+1}), \ldots, \bar{y}(f_{k-1+N_{tile(bin)\_size}})]^T.$$

That is, only the phase rotation value of the SDMA user remains by multiplying the FFT signal by the PN code vector of the AAS preamble.

The number of channel estimators 311 to 313 provided is the same as the number of AMC bins (or PUSC tiles). The channel estimators 311 to 313 calculate average channel estimates representative of their corresponding AMC bins (or PUSC tiles) by computing Eq. (3) using the output of the preamble code multiplier 309.

Channel estimation is carried out on a bin-by-bin basis (or on a tile-by-tile basis) by $$H(f_n) = a^H \bar{y}_n \quad (3)$$

where $H(f_n)$ denotes a channel estimate representative of an $n^{th}$ bin (or tile), $\bar{y}_n$ denotes the nth AMC bin (or PUSC tile) multiplied by the PN code vector according to Eq. (2), a denotes a unique orthonormal kernel between SDMA users described in Eq. (1), and $a^H$ denotes the Hermitian of a.

As described above, the general frequency-domain channel estimation is performed by cross-relation of orthonormal kernels between SDMA users as expressed in Eq. (1), Eq. (2) and Eq. (3) in the SDMA-OFDMA system. Thus, the channel estimate of each bin (or tile) is achieved. This channel estimation information is used when calculating a beam coefficient for the data area.

Meanwhile, if the channel conditions varies greatly over time, application of the channel information estimated by the preamble to data in a different time area degrades performance. For example, in the IEEE 802.16e OFDMA system which takes into account mobility, the variation of the channel condition increases with the mobility of the MS. Therefore, the performance degradation caused by application of the channel estimation estimated by the preamble to beamforming for a data area that is different in time, reduces the gain achieved by using the smart antenna system.

Accordingly, there is a need for an improved apparatus and method with improved channel estimation performance that increases the gain of a smart antenna system.

SUMMARY OF THE INVENTION

Exemplary embodiments of the present invention address at least the above problems and/or disadvantages and provide at least the advantages described below. Accordingly, an aspect of the present invention is to provide an apparatus and method for performing accurate channel estimation for an MS having a high degree of mobility and communicating at a high data rate in an SDMA-OFDMA system.

Another object of an exemplary embodiment of the present invention is to provide an apparatus and method for performing accurate channel estimation using an AAS preamble and pilots in an SDMA-OFDMA system.

A further object of an exemplary embodiment of the present invention is to provide an apparatus and method for performing channel estimation by linear interpolation in an SDMA-OFDMA system.

The above objects are achieved by providing a channel estimation apparatus and method in a broadband wireless communications system using a smart antenna.

According to one aspect of an exemplary embodiment of the present invention, in a channel estimation apparatus in a broadband wireless communications system using a smart antenna in which a data area includes pilot tones and data tones, an FFT processor converts a received time-domain signal to a frequency-domain signal by FFT-processing the received time-domain signal. A channel acquirer estimates a first channel information for an SDMA user using a preamble signal allocated to the SDMA user in the frequency-domain signal. A channel tracker estimates a second channel information for the SDMA user using pilots in a data area allocated to the SDMA user in the frequency-domain signal. A channel estimator estimates a final channel information by weighting the first channel information and the second channel information according to a channel change rate.

According to another aspect of an exemplary embodiment of the present invention, in a channel estimation method in a broadband wireless communications system using a smart antenna in which a data area includes pilot tones and data tones, first channel information about all tones of a frequency band for an SDMA user is estimated using a preamble of a received signal. A channel change rate of the SDMA user is compared with a user-set threshold. Second channel information for the SDMA user is estimated using pilots in a data area allocated to the SDMA user, if the channel change rate is higher than the threshold. Final channel information is estimated by applying weights to the first channel information and the second channel information.

According to a further aspect of an exemplary embodiment of the present invention, in a method of channel estimation using pilots in a broadband wireless communications system using a smart antenna in which a data area includes pilot tones and data tones, a first channel information is estimated using a preamble of a signal achieved by FFT-processing a received signal. Co-channel interference (CCI) is cancelled from the pilots of the received signal using the first channel information. Final channel information about tones in a data area allocated to an SDMA user is estimated by linear interpolation using the CCI-canceled pilots.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An exemplary embodiment of the present invention is intended to provide a technique for performing accurate channel estimation in a broadband wireless communications system supporting SDMA. In order to estimate accurate channel information for an MS performing high-speed data communications and having a high degree of mobility, a channel acquisition mode is carried out using an AAS preamble for a user that has remained in a consistent channel state for a predetermined period of time and a user that is in a low-speed data communication. Further, a channel tracking mode is carried out using pilots for a user in a highly dynamic channel state and user in a high-speed data communication. Thus, channel estimation is adapted to the mobility and data rates of the users. The following description is made in the context of an SDMA-OFDMA system. A data area is comprised of data tones and pilot tones.

Figure 1:
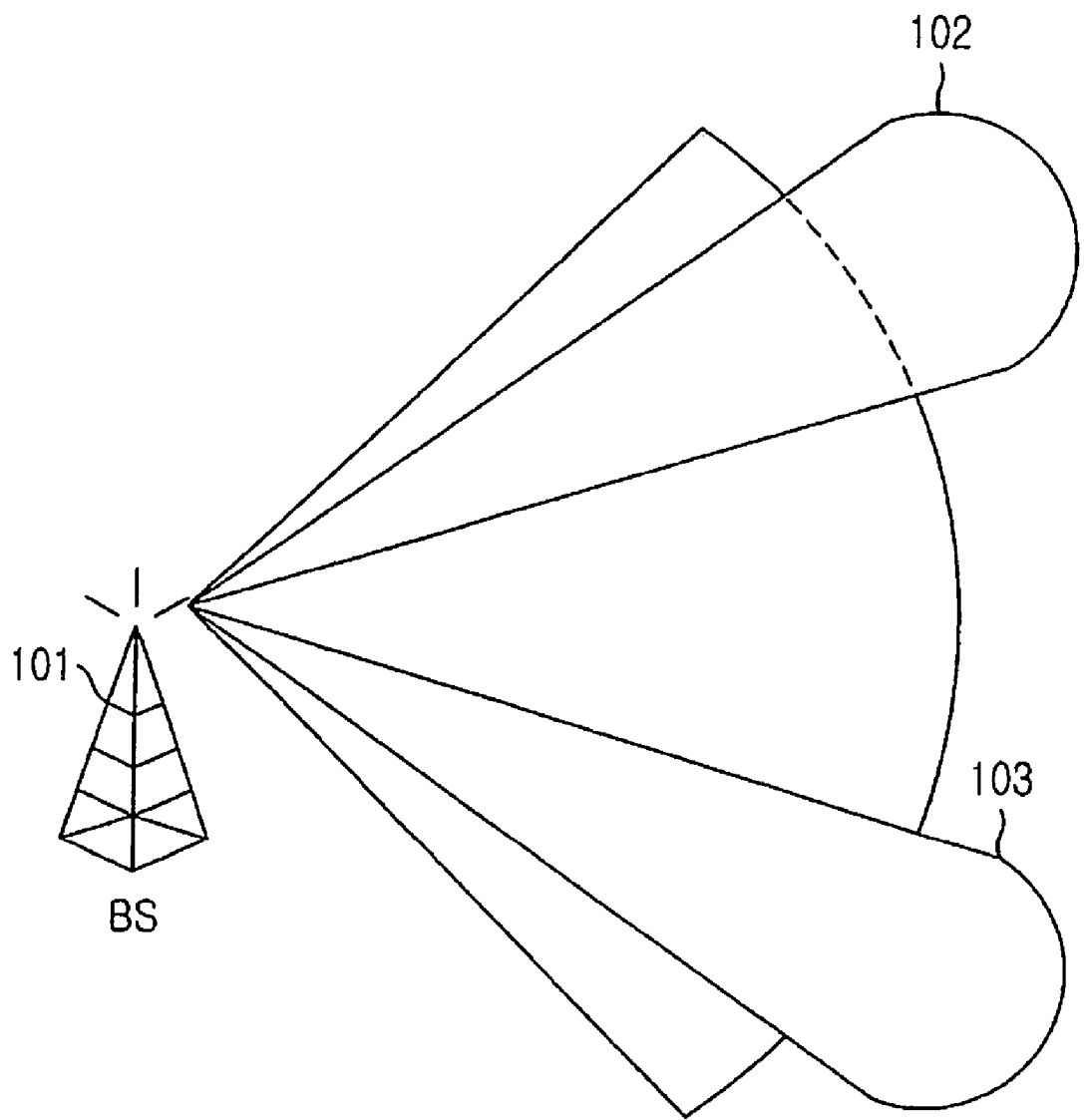
FIG. 1 illustrates a conventional SDMA cellular system.
Figure 2:
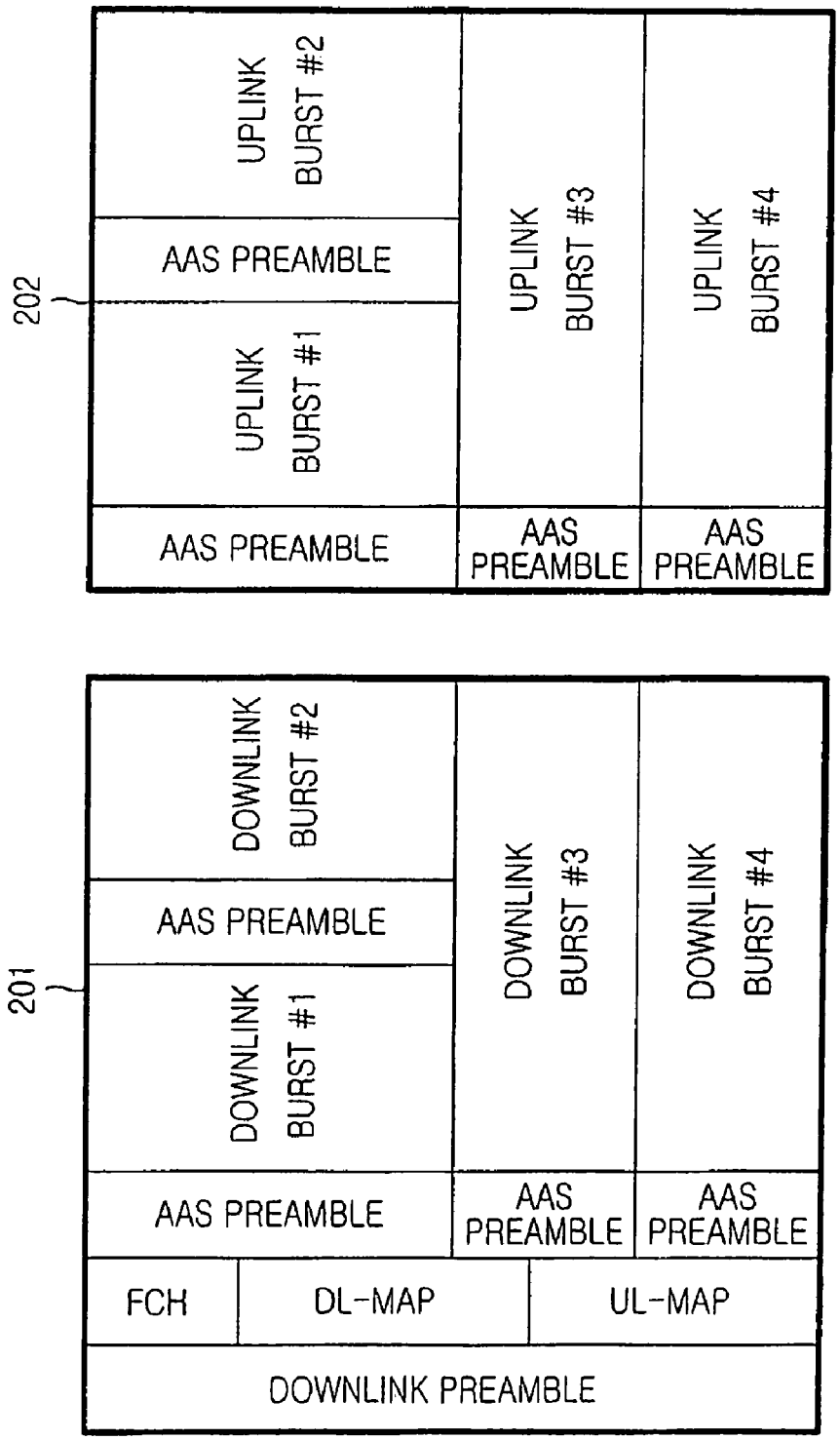
FIG. 2 illustrates the structures of a downlink frame and an uplink frame in a conventional IEEE 802.16 OFDMA system.
Figure 3:
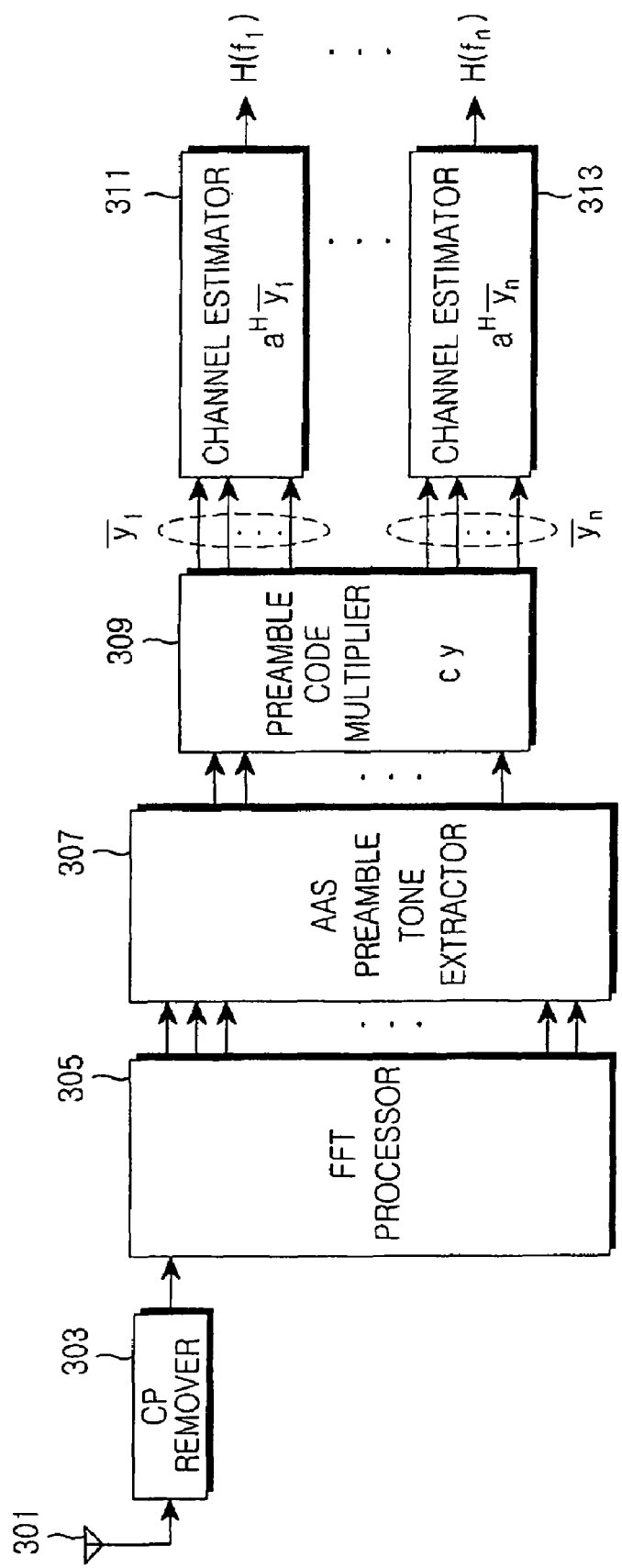
FIG. 3 is a block diagram of an uplink channel estimation apparatus in a BS in a conventional SMDA-OFDMA system.
Figure 4:
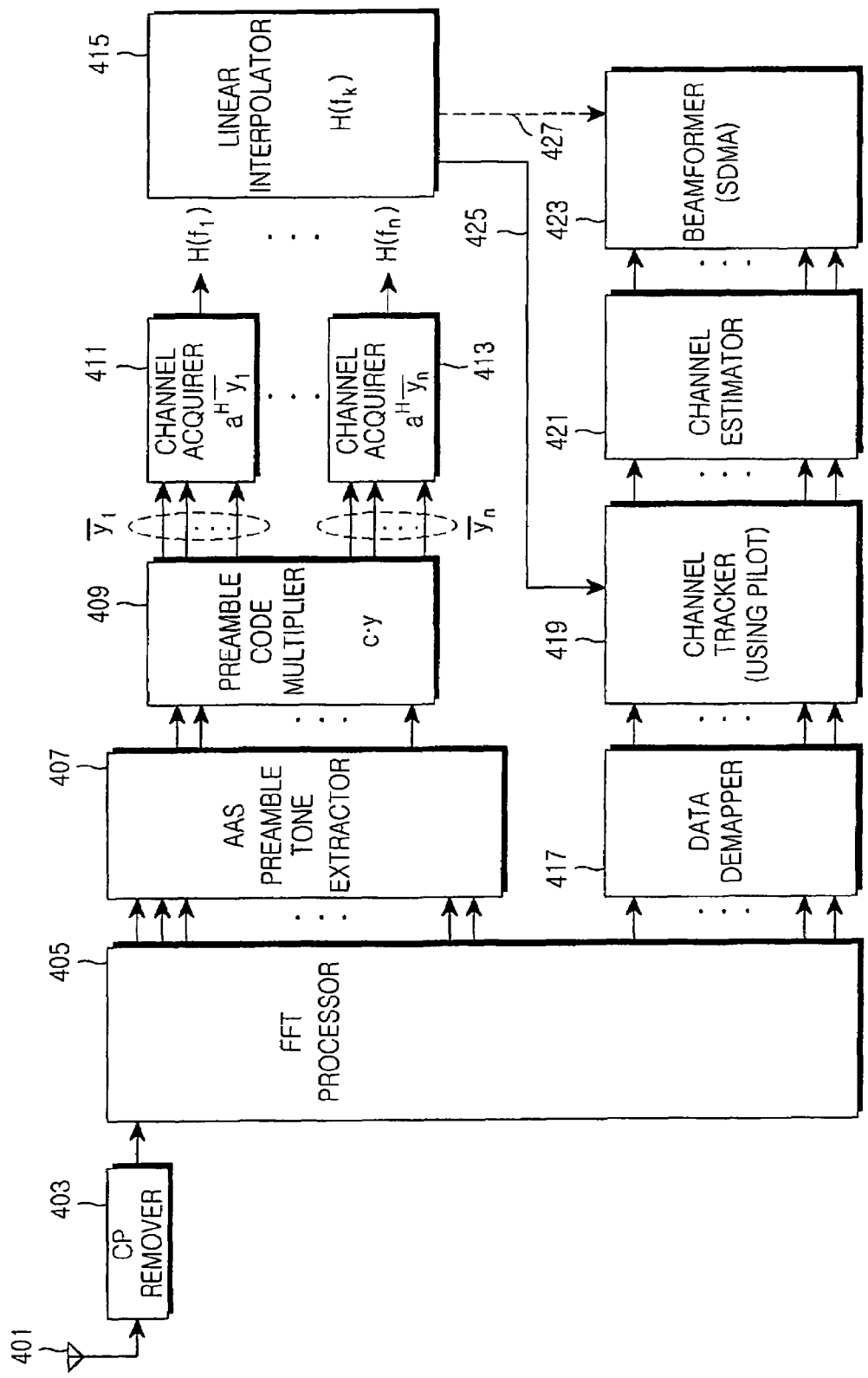
FIG. 4 is a block diagram of an uplink channel estimation apparatus in a BS in an SMDA-OFDMA system according to an exemplary embodiment of the present invention.

FIG. 4 is a block diagram of an uplink channel estimation apparatus in a BS in an SDMA-OFDMA system according to an exemplary embodiment of the present invention.

Referring to FIG. 4, the BS downconverts an RF signal received through an antenna 401 to a baseband signal and converts the baseband analog signal to a baseband digital signal.

A CP remover 403 removes a CP from the baseband digital signal. A FFT processor 405 converts the time-domain signal received from the CP remover 403 into a frequency-domain signal by using an N-point FFT.

A preamble tone extractor 407 extracts a preamble signal from the frequency-domain signal that corresponds to an area allocated to an SDMA user. A preamble code multiplier 409 removes a PN code sequence which has been multiplied by the tones of the preamble signal from the preamble signal by multiplying the AAS preamble of the FFT signal by the PN code vector according to Eq. (2). Thus, only the phase rotation value corresponding to the SDMA user remains.

The number of channel acquirers 411 to 413 provided is the same as the number of AMC bins (or PUSC tiles). The channel acquirers 411 to 413 acquire average channel estimates representative of the respective AMC bins (or PUSC tiles) of the AAS preamble using the output of the preamble code multiplier 409 according to Eq. (3).

A linear interpolator 415 estimates channel information about all frequency tones for the SDMA user by linear interpolation of the channel estimates in the frequency domain, thereby increasing the channel estimation performance of the used frequency band. For example, channel information about all tones is estimated by linearly interpolating channel estimates 501, 503, 505 and 507 in FIG. 5. It is to be noted herein that the linear interpolation is performed in the case where the frequency band of the AAS preamble channel covers successive AMC bins (or PUSC tiles).

Meanwhile, a data demapper 417 extracts a data area for the SDMA user from the frequency-domain signal received from the FFT processor 405. As illustrated in FIGS. 7A, 7B and 7C, the data area includes pilot tones 701 to 706 and the remaining data tones. A channel tracker 419 performs channel estimation using pilot tones of the data area. Since the pilot tones are common to all SDMA users, they provide channel information about the SDMA users. To estimate a highly dynamic channel for a user, CCI is cancelled from the pilots using channel information 425 estimated using the preamble by $$H_1^{track} = y \cdot p - \sum_{\mu=2}^{U} H_\mu^{acq} \quad (4)$$

where $H_1^{track}$ denotes CCI-cancelled pilots for a first moving user who, P denotes the PN code of the pilot signal, y denotes the received pilot signal, and $H_\mu^{acq}$ denotes channel information about the other users acquired using the preamble. Given two users, $y=H_1P+H_2P$, if noise is neglected. Therefore, $y \circ p = H_1 + H_2$ and $H_1$ is obtained by subtracting the channel information of the other user acquired using the preamble, $H_2$ from $y \circ p$.

After the CCI cancellation, the channel tracker 419 tracks channel information on all tones (data tones and pilot tones) of the data area by linear interpolation, which will be described later in more detail with reference to FIGS. 6 and 7.

A channel estimator 421 estimates final channel information using a second channel estimate obtained using the pilot tones by the channel tracker 419 and a first channel estimate acquired using the preamble by the channel acquirer 411 according to the following equation.

$$\hat{H}_k = \begin{bmatrix} \hat{H}(f_k) \\ \hat{H}(f_{k+1}) \\ \vdots \\ \hat{H}(f_{k+Bin(tile)\_Size-1}) \end{bmatrix} = \qquad (5)$$

$$\alpha \begin{bmatrix} \hat{H}_{preamble}(f_k) \\ \hat{H}_{preamble}(f_{k+1}) \\ \vdots \\ \hat{H}_{preamble}(f_{k+Bin(tile)\_Size-1}) \end{bmatrix} + (1-\alpha) \begin{bmatrix} \hat{H}_{pilot}(f_k) \\ \hat{H}_{pilot}(f_{k+1}) \\ \vdots \\ \hat{H}_{pilot}(f_{k+Bin(tile)\_Size-1}) \end{bmatrix}$$

where $\hat{H}_{preamble}(f_k)$ denotes the first channel estimate acquired using the preamble in the channel acquirer 411, $\hat{H}_{pilot}(f_k)$ denotes the second channel estimate tracked using the pilots in the channel tracker 419, and α is a parameter representing a channel change rate, ranging $0 \leq \alpha \leq 1$. α depends on a Doppler frequency and a Carrier to Noise Ratio (CNR). If the CNR is high, α is set to be small so that the second channel estimate is weighted more heavily. If the CNR is low, α is set to be larger so that the first channel estimate is weighted more heavily.

A beamformer 423 forms a beam for the SDMA user based on the final channel information estimated by the channel estimator 421. If all SDMA users are quasi-static, only the channel estimate 427 provided by the linear interpolator 415 is used for beamforming.

Figure 6:
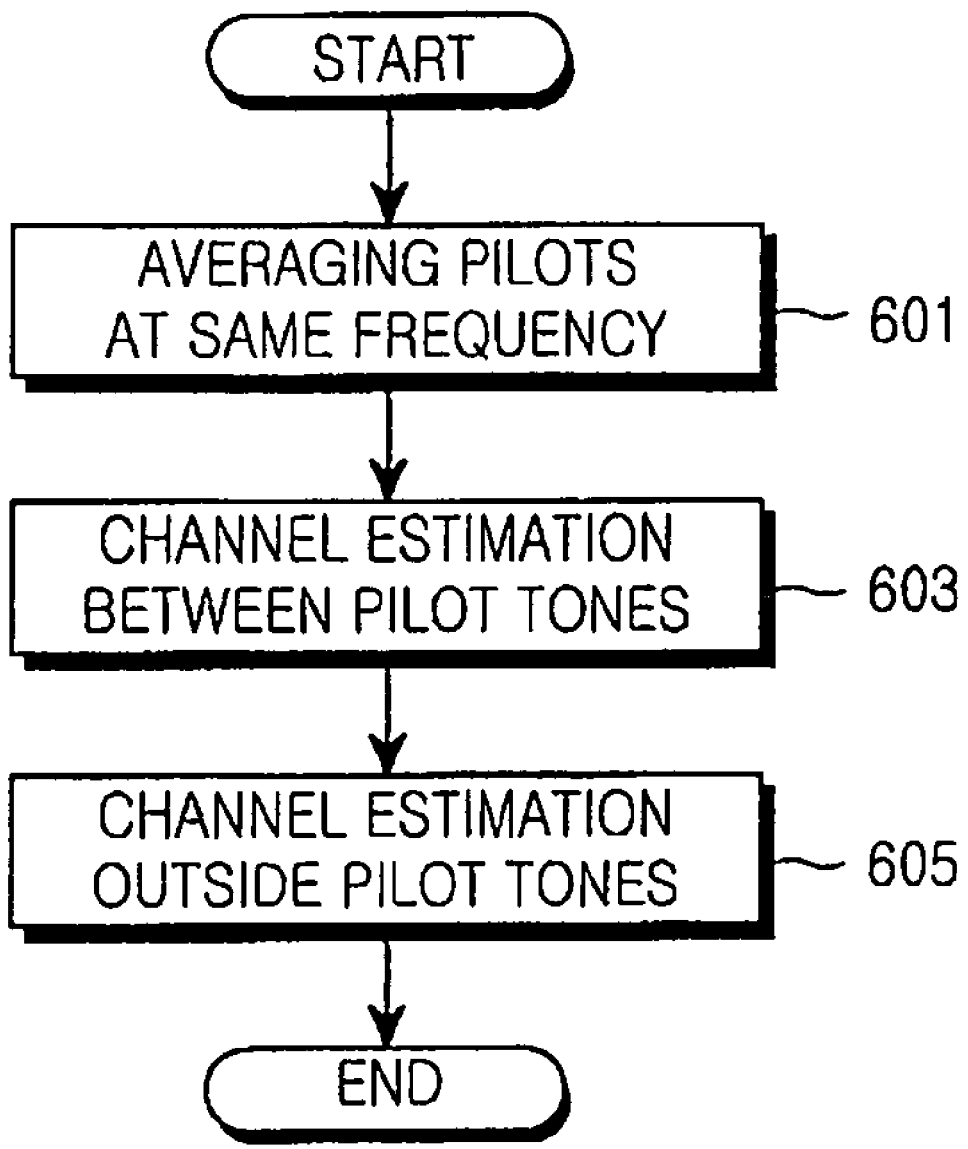
FIG. 6 is a flowchart illustrating an operation for acquiring channel information using pilots according to an exemplary embodiment of the present invention.
Figure 7:
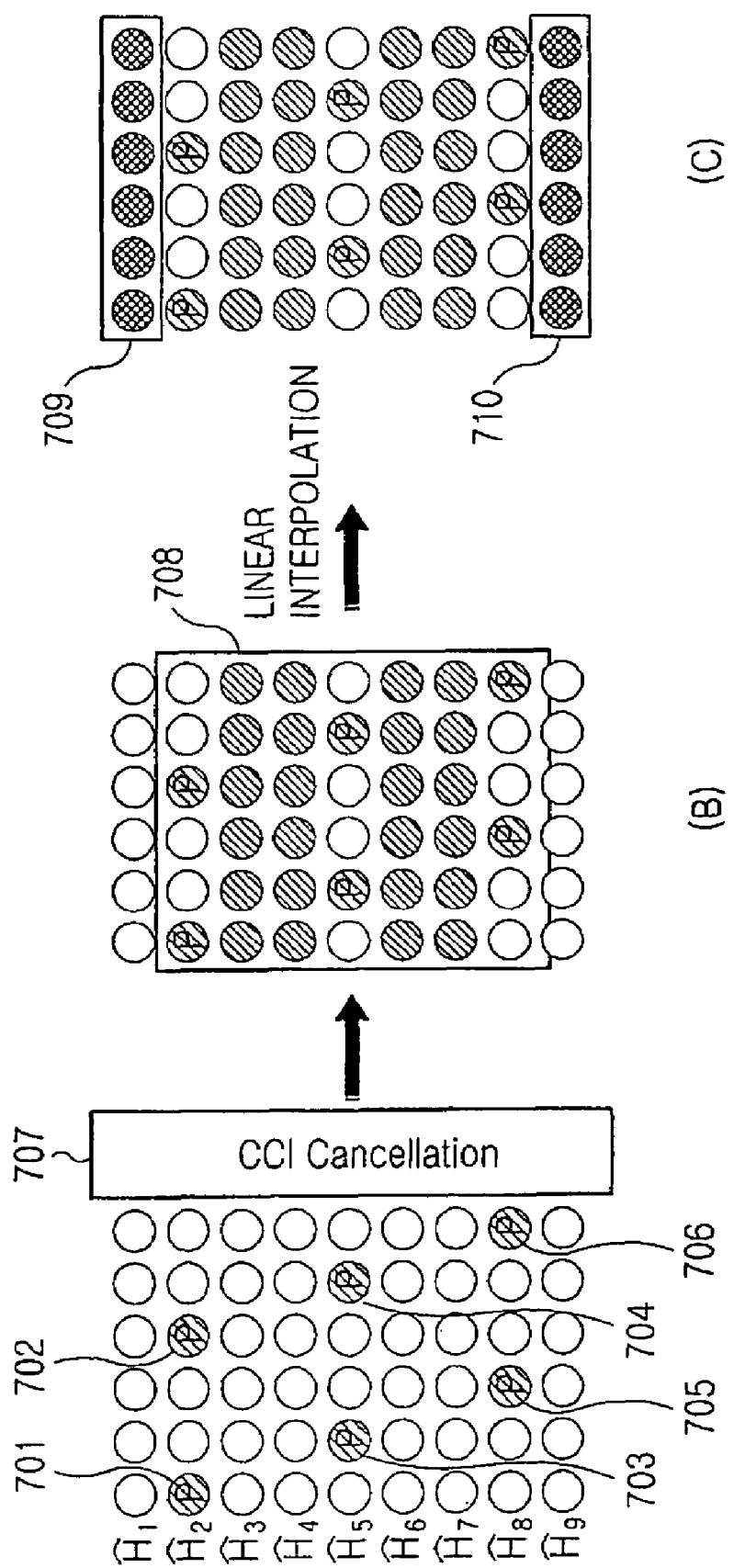
FIGS. 7A, 7B and 7C illustrate an operation for performing channel estimation on channels other than channels with pilot tones by linear interpolation according to an exemplary embodiment of the present invention.

FIG. 6 is a flowchart illustrating an operation for performing channel estimation using pilots according to an exemplary embodiment of the present invention. In the following description, channel estimates for one bin are assumed to be $\hat{H}_1$ to $\hat{H}_9$ and channel estimation is carried out in the same manner for a bin and a tile. FIGS. 7A, 7B and 7C illustrate channel estimation of all tones using pilots. In FIGS. 7A, 7B and 7C, a horizontal axis represents time and a vertical axis represents frequency.

Referring to FIG. 6, the BS averages pilots at the same frequency and copies the average onto data tones in the same channel having the pilots in step 601. That is, the channel value of the channel having the pilot tones is estimated to be the average of the pilot tones. In FIG. 7A, for example, the channel values $\hat{H}_2$, $\hat{H}_5$ and $\hat{H}_8$ of channels having pilot tones are computed by $$\hat{H}_2 \frac{P_1 + P_2}{2} \qquad (6)$$

where $P_1$ and $P_2$ denote pilots 701 and 702, respectively. According to Eq. (6), $\hat{H}_2$ is the average of the pilots 701 and 702 at the same frequency.

In step 603, the BS linearly interpolates among the channels with the pilot tones, thereby estimating the channel values of the remaining channels. In the above example, the channel values $\hat{H}_3$, $\hat{H}_4$, $\hat{H}_6$ and $\hat{H}_7$ of the channels between the pilot tones are computed by linear interpolation of the channel values $\hat{H}_2$, $\hat{H}_5$ and $\hat{H}_8$ of the channels having the pilot tones according to the following equation.

$$\hat{H}_3 = \frac{2}{3}\hat{H}_2 + \frac{1}{3}\hat{H}_5, \ \hat{H}_4 = \frac{1}{3}\hat{H}_2 + \frac{2}{3}\hat{H}_5 \qquad (7)$$

In this way, the channel values of channels between channels with pilot tones are estimated.

The BS then estimates the values of channels outside a block 708, shown in FIG. 7B, defined by the pilot tones in step 605. In FIG. 7C, channel values $\hat{H}_1$ 709 and $\hat{H}_9$ 710 outside the pilot tones are estimated by $$\hat{H}_1 = \hat{H}_2 \times \hat{H}_2\hat{H}_3*/abs(\hat{H}_2\hat{H}_3*)$$

$$\hat{H}_9 = \hat{H}_8 \times \hat{H}_8\hat{H}_7*/abs(\hat{H}_8\hat{H}_7*) \qquad (8)$$

where $\hat{H}_2\hat{H}_3*/abs(\hat{H}_2\hat{H}_3*)$ denotes the phase difference between $\hat{H}_2$ and $\hat{H}_3$, and $\hat{H}_8\hat{H}_7*/abs(\hat{H}_8\hat{H}_7*)$ denotes the phase difference between $\hat{H}_7$ and $\hat{H}_8$. Dividing of the vectors with phases $\hat{H}_2\hat{H}_3*$ and $\hat{H}_8\hat{H}_7*$ by their respective absolute values $abs(\hat{H}_2\hat{H}_3*)$ and $abs(\hat{H}_8\hat{H}_7*)$ results in only the phases of the vectors. Hence, $\hat{H}_1$ is a channel value obtained by compensating $\hat{H}_2$ for the phase difference between $\hat{H}_2$ and $\hat{H}_3$ and $\hat{H}_9$ is a channel value obtained by compensating $\hat{H}_8$ for the phase difference between $\hat{H}_7$ and $\hat{H}_8$.

Figure 8:
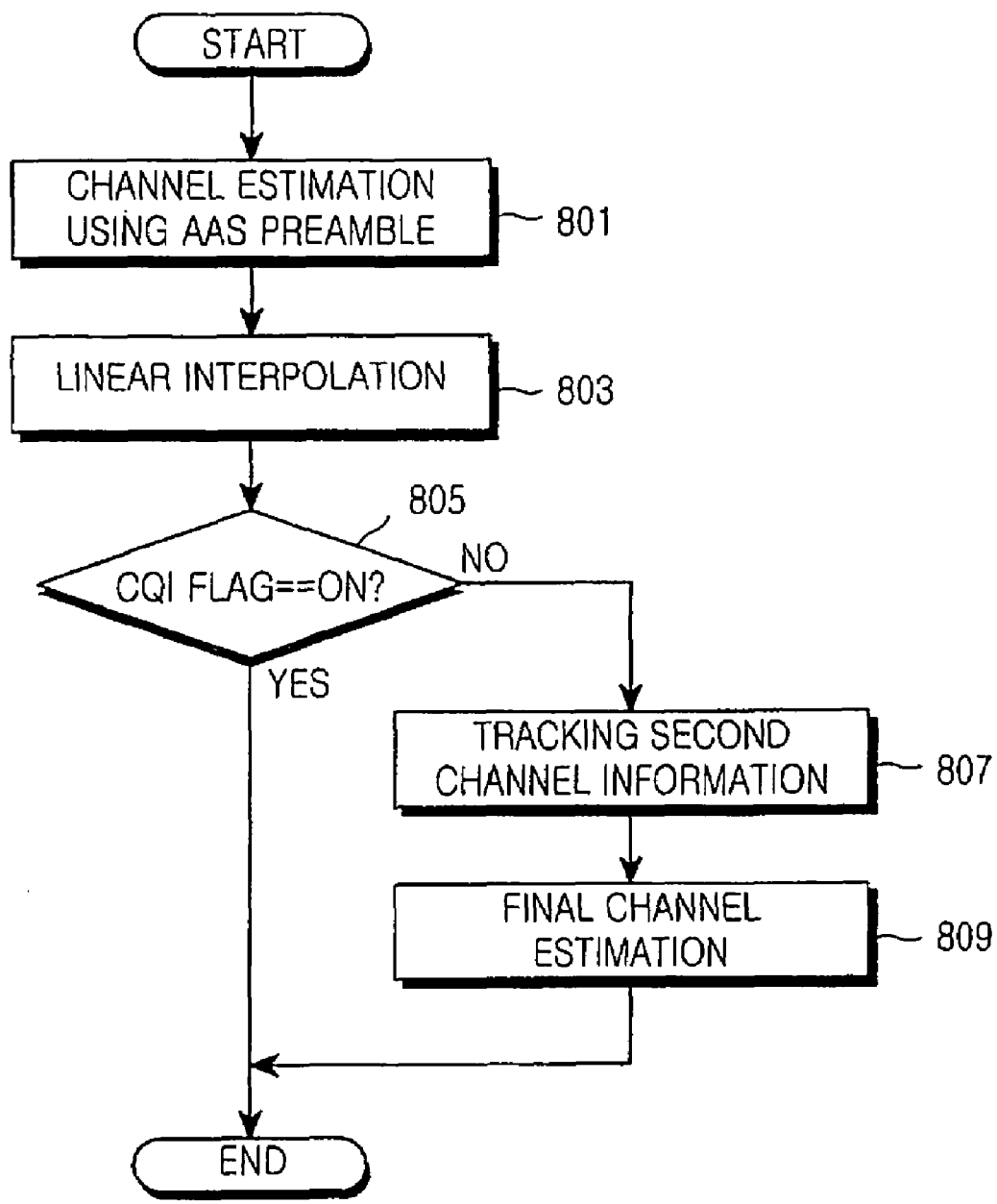
FIG. 8 is a flowchart illustrating an uplink channel estimation operation in the SDMA-OFDMA system according to an exemplary embodiment of the present invention.

FIG. 8 is a flowchart illustrating an uplink channel estimation operation in the SDMA-OFDMA system according to an exemplary embodiment of the present invention.

Referring to FIG. 8, the BS estimates channel information representative of bins (or tiles) using an AAS preamble in step 801.

Figure 5:
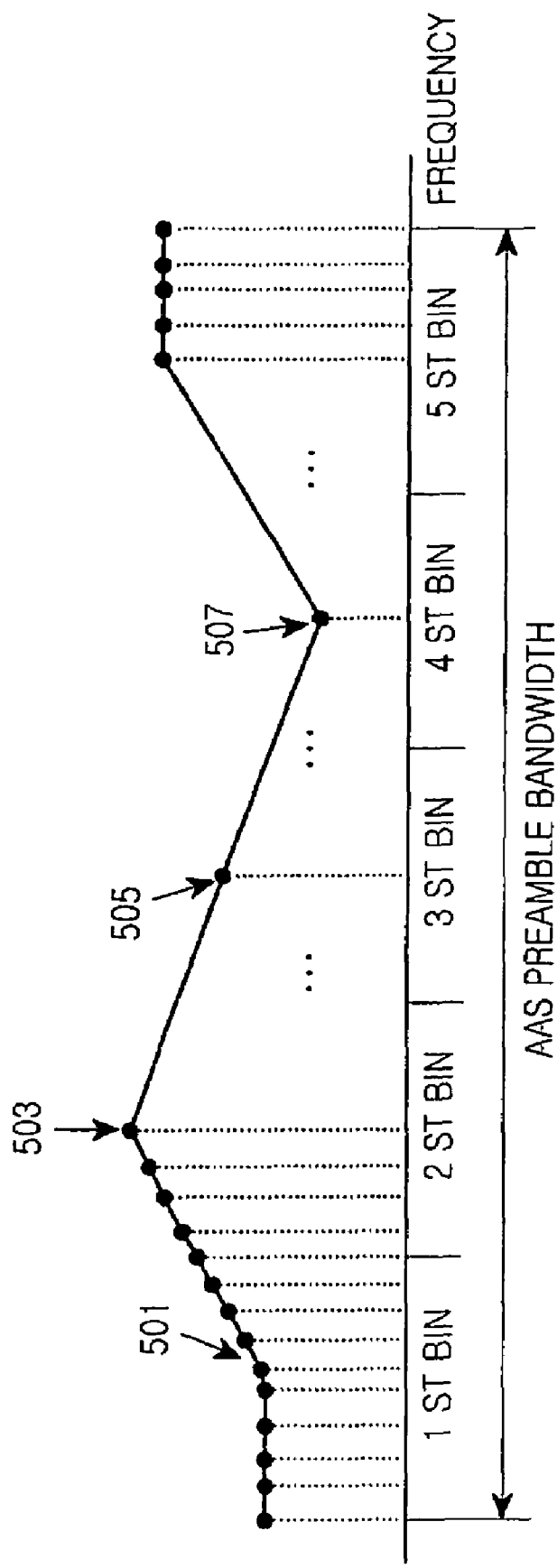
FIG. 5 is a diagram illustrating channel estimation based on representative channel values estimated by an AAS preamble and linear interpolation according to an exemplary embodiment of the present invention.

In step 803, the BS estimates a first channel information about the total frequency band of an SDMA user by linear interpolation between the estimated channel information, as illustrated in FIG. 5. The linear interpolation is available in case the frequency band of the AAS preamble channel covers successive AMC bins (or PUSC tiles).

The BS determines whether a Channel Quality Information (CQI) flag is on in step 805. The CQI flag is set according to the Doppler frequency and CNR of the SDMA user. If the CQI flag is on, the BS forms a beam based on the channel information estimated using the AAS preamble and then ends the algorithm. If one or more of the Doppler frequency, the CNR, a modulation order, and a coding rate is equal to or larger than a threshold or thresholds set by the system operator, the CQI flag is off.

If the CQI flag is off, the BS tracks a second channel information using the first channel information and pilots in a data area in step 807.

In step 809, the BS estimates final channel information by weighting the first and second channel information according to a channel change rate. Then the algorithm ends. Thus, the BS forms a beam based on the channel information estimated by the AAS preamble and the pilots.

As described above, if the CQI flag is on, which implies that all SDMA users are quasi-static, beamforming is carried out using the first channel information estimated using the preamble. If the CQI flag is off, beamforming is carried out using the final channel information derived from the first channel information and the second channel information tracked using the pilots.

Figure 9:
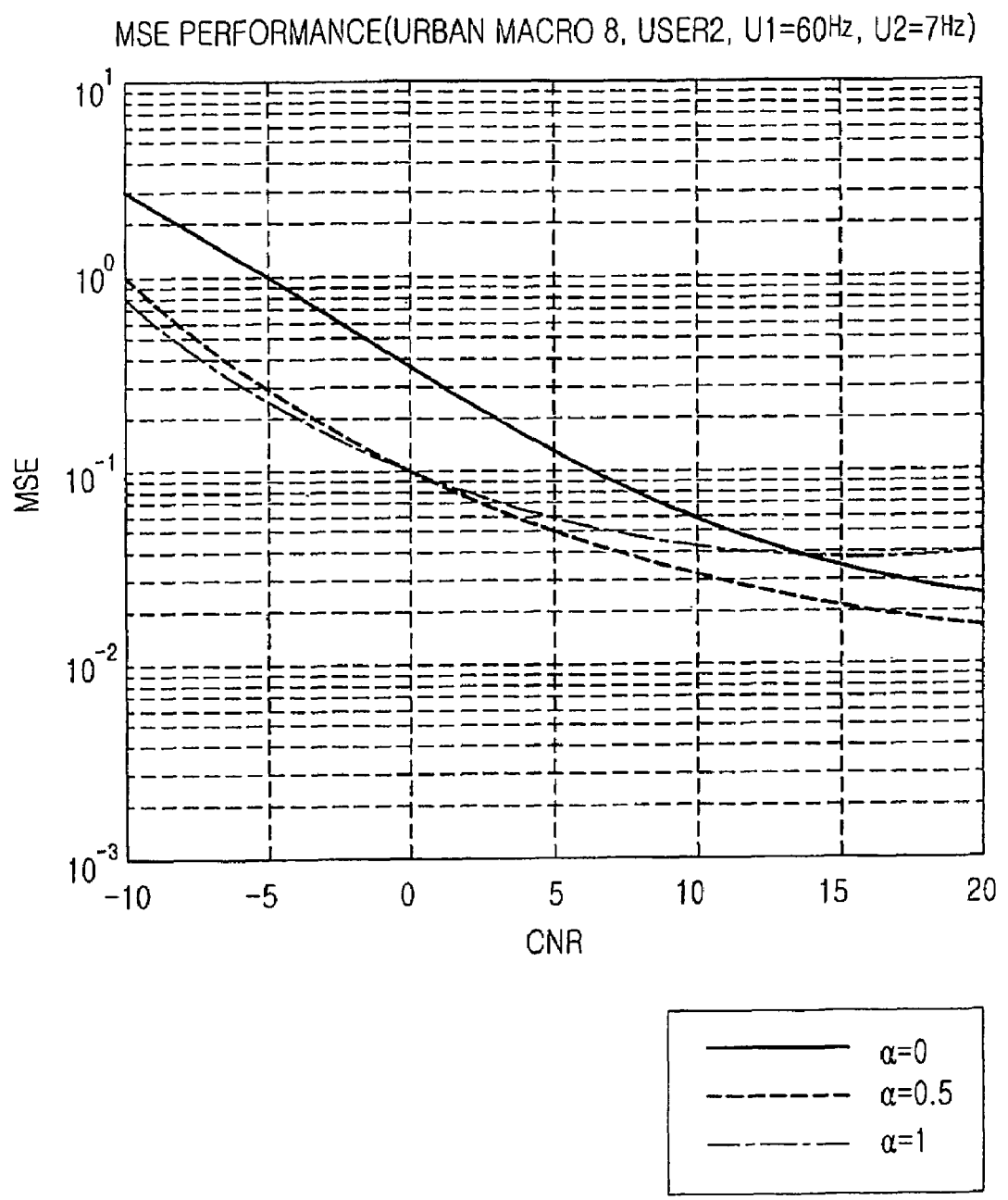
FIG. 9 is a graph illustrating improved performance of an exemplary embodiment of the present invention.

FIG. 9 is a graph illustrating improved performance of an exemplary embodiment of the present invention. In FIG. 9, a horizontal axis denotes CNR and a vertical axis denotes Mean Square Error (MSE). The performance was evaluated under the simulation condition that two SDMA users use 60 Hz and 7 Hz, respectively in a Spatial Channel Model (SCM) Urban Macro environment with E{AS}=8°, that is, in a bad channel environment with severe multipath fading.

Referring to FIG. 9, the curves show the CNR versus MSE of the channel information of a first user in the case where channel estimation is performed while a weight α, used for estimating final channel information, is changed to 0, 0.5 and 1 according to an exemplary embodiment of the present invention. For α=0, the same performance as achieved using only pilots is shown. For α=1, the same performance as achieved using only a preamble is shown.

For α=0.5, the channel estimation using the first channel information obtained using the preamble and the second channel information tracked using the pilots performs best.

In accordance with an exemplary embodiment of the present invention as described above, a channel acquisition mode using an AAS preamble and a channel tracking mode using pilots are applied to a user with high mobility in an SDMA-OFDMA system. Therefore, channel estimation performance is improved and thus the gain of smart antenna technology is increased, as compared to the use of only the channel acquisition mode in the conventional technology.

While the invention has been shown and described with reference to certain embodiments thereof, it will be understood by those skilled in the art that various changes in form and details may be made therein without departing from the spirit and scope of the invention as defined by the appended claims.

What is claimed is:

1. A channel estimation apparatus in a broadband wireless communications system using a smart antenna in which a data area comprises pilot tones and data tones, comprising:
   a Fast Fourier Transform (FFT) processor for converting a received time-domain signal into a frequency-domain signal by FFT-processing the received time-domain signal;
   a channel acquirer for estimating a first channel information for a space division multiple access (SDMA) user using a preamble signal allocated to the SDMA user in the frequency-domain signal;
   a channel tracker for estimating a second channel information for the SDMA user using pilots in a data area allocated to the SDMA user in the frequency-domain signal; and
   a channel estimator for estimating a final channel information by weighting the first channel information and the second channel information according to a channel change rate.

2. The channel estimation apparatus of claim 1, wherein the channel acquirer comprises:
   a preamble tone extractor for extracting the preamble signal in the area allocated to the SDMA user from the frequency-domain signal;
   a preamble code multiplier for removing a pseudo noise (PN) code from the extracted preamble signal on a predetermined frequency basis;
   a first channel estimator for calculating representative channel information on the predetermined frequency basis using the output of the preamble code multiplier and a conjugate of a predetermined vector identifying the SDMA user; and
   a linear interpolator for acquiring channel information about all tones of a frequency band used for the SDMA user by linear interpolation of the representative channel information.

3. The channel estimation apparatus of claim 2, wherein the predetermined vector is created by linear phase rotation of the predetermined PN code in a frequency domain, the amount of linear phase rotation is equivalent to a predetermined amount of time shift.

4. The channel estimation apparatus of claim 2, wherein the predetermined frequency basis is one of an adaptive modulation and coding (AMC) bin and a partial usage subchannel (PUSC) tile.

5. The channel estimation apparatus of claim 1, wherein the channel tracker comprises:
   a data demapper for extracting a data area allocated to the SDMA user from the frequency-domain signal; and
   a second channel estimator for estimating channel information about all tones of the data area using pilots in the data area.

6. The channel estimation apparatus of claim 5, wherein the second channel estimator cancels co-channel interference from the pilots of a received signal using the first channel information received from the channel acquirer and estimates the second channel information about all the tones of the data area by linear interpolation using the co-channel interference-canceled pilots.

7. The channel estimation apparatus of claim 1, wherein if the channel change rate is high, the channel estimator estimates the final channel information by weighting the second channel information more heavily than the first channel information, and if the channel change rate is low, the channel estimator estimates the final channel information by weighting the first channel information more heavily than the second channel information.

8. The channel estimation apparatus of claim 1, wherein the channel estimator determines the channel change rate according to at least one of a Doppler frequency and a carrier to noise ratio (CNR) of the SDMA user.

9. A channel estimation method in a broadband wireless communications system using a smart antenna in which a data area comprises pilot tones and data tones, comprising the steps of:
   estimating a first channel information about all tones of a frequency band for a space division multiple access (SDMA) user using a preamble of a received signal;
   comparing a channel change rate of the SDMA user with a user-set threshold;
   estimating a second channel information for the SDMA user using pilots in a data area allocated to the SDMA user, if the channel change rate is higher than the threshold; and
   estimating a final channel information by applying weights to the first channel information and the second channel information.

10. The channel estimation method of claim 9, further comprising the step of forming a beam using the first channel information only, if the channel change rate is equal to or lower than the threshold.

11. The channel estimation method of claim 9, further comprising the step of forming a beam using the final channel information.

12. The channel estimation method of claim 9, wherein the predetermined frequency basis is an adaptive modulation and coding (AMC) bin or a partial usage subchannel (PUSC) tile.

13. The channel estimation method of claim 9, wherein the channel change rate is determined according to at least one of a Doppler frequency and a carrier to noise ratio (CNR) of the SDMA user.

14. The channel estimation method of claim 9, wherein the second channel information estimation step comprises the steps of:
canceling co-channel interference from the pilots of a received signal using the first channel information; and
estimating the second channel information about all the tones of the data area by linear interpolation using the co-channel interference-canceled pilots.

15. The channel estimation method of claim 14, wherein the co-channel interference-canceled pilots $H_1^{track}$ are computed by $$H_1^{track} = y \cdot p - \sum_{u=2}^{U} H_u^{acq} \quad (9)$$

where y denotes the pilot signal of the received signal, P denotes a PN code of the pilot signal, and $H_\mu^{acq}$ denotes channel information about a $u^{th}$ acquired using the preamble.

16. The channel estimation method of claim 14, wherein the linear interpolation comprises the steps of:
averaging pilots at the same frequency in the data area and estimating channel information about channels with the pilot tones using the pilot averages;
estimating channel information about channels between the channels with the pilot tones by linear interpolation of the channel information of the channels with the pilot tones; and
estimating channel information about channels outside the pilot tones using the channel information estimated using the pilots.

17. The channel estimation method of claim 16, wherein the channel information about the channels outside the pilot tones, $\hat{H}_1$ and $\hat{H}_9$ are computed by $$\hat{H}_1 = \hat{H}_2 \times \hat{H}_2 \hat{H}_3 * / abs(\hat{H}_2 \hat{H}_3 *)$$

$$\hat{H}_9 = \hat{H}_8 \times \hat{H}_8 \hat{H}_7 * / abs(\hat{H}_8 \hat{H}_7 *) \quad (16)$$

where $\hat{H}_1$ to $\hat{H}_9$ are channel information estimated in one bin of the data area, $\hat{H}_2 \hat{H}_3 */abs(\hat{H}_2 \hat{H}_3 *)$ denotes a phase difference between $\hat{H}_2$ and $\hat{H}_3$, and $\hat{H}_8 \hat{H}_7 */abs(\hat{H}_8 \hat{H}_7 *)$ denotes a phase difference between $\hat{H}_7$ and $\hat{H}_8$.

18. The channel estimation method of claim 9, wherein the weights are determined according to at least one of a Doppler frequency and a carrier to noise ratio (CNR) of the SDMA user and range between 0 and 1.

19. The channel estimation method of claim 9, wherein the final channel information $\hat{H}_k$ is computed by $$\hat{H}_k = \begin{bmatrix} \hat{H}(f_k) \\ \hat{H}(f_{k+1}) \\ \vdots \\ \hat{H}(f_{k+Bin(tile)\_Size-1}) \end{bmatrix} = \quad (11)$$

$$\alpha \begin{bmatrix} \hat{H}_{preamble}(f_k) \\ \hat{H}_{preamble}(f_{k+1}) \\ \vdots \\ \hat{H}_{preamble}(f_{k+Bin(tile)\_Size-1}) \end{bmatrix} + (1-\alpha) \begin{bmatrix} \hat{H}_{pilot}(f_k) \\ \hat{H}_{Pilot}(f_{k+1}) \\ \vdots \\ \hat{H}_{pilot}(f_{k+Bin(tile)\_Size-1}) \end{bmatrix}$$

where $\hat{H}_{preamble}(f_k)$ denotes the first channel information about all frequency tones, acquired using the preamble, $\hat{H}_{pilot}(f_k)$ denotes the second channel information about all tones of the data area, acquired using the pilot signal, and α is a weight determined by the channel change rate.

* * * * *

UNITED STATES PATENT AND TRADEMARK OFFICE
CERTIFICATE OF CORRECTION

PATENT NO. : 7,647,073 B2  Page 1 of 1
APPLICATION NO. : 11/368532
DATED : January 12, 2010
INVENTOR(S) : Sung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 920 days.

Signed and Sealed this

Sixteenth Day of November, 2010

David J. Kappos
*Director of the United States Patent and Trademark Office*